Aug. 12, 1969     L. J. BONIS ET AL     3,460,971
METHOD FOR THE PRODUCTION OF COMPOSITE MATERIALS
AND ARTICLES PRODUCED THEREBY
Filed Jan. 18, 1966

INVENTORS
LASZLO J. BONIS
ROBERT GRIERSON

BY Kenway, Jenney & Hildreth

ATTORNEYS

United States Patent Office 3,460,971
Patented Aug. 12, 1969

3,460,971
METHOD FOR THE PRODUCTION OF COMPOSITE MATERIALS AND ARTICLES PRODUCED THEREBY
Laszlo J. Bonis, Brookline, and Robert Grierson, Framingham, Mass., assignors to Ilikon Corporation, Natick, Mass., a corporation of Delaware
Filed Jan. 18, 1966, Ser. No. 521,341
Int. Cl. B44d 1/12
U.S. Cl. 117—71   6 Claims

ABSTRACT OF THE DISCLOSURE

A method of making a metal oxide article having tightly bonded thereto a coating of a second metal. The metal oxide article may be in the form of monocrystalline fibers. The metal oxide article is first coated with the second metal as by electroless deposition; the second metal coating is then oxidized throughout its volume. The oxide coated articles are then subjected to a temperature above the spinel-forming temperature so that a spinel structure is formed between the metal oxide article and the oxide coating of the second metal. The second metal oxide coating may then be reduced so that the final article is coated with the second metal. Monocrystalline fibers so coated may be readily incorporated into a matrix of the second metal or its alloys to provide reinforced materials of great strength.

---

Figure 1:
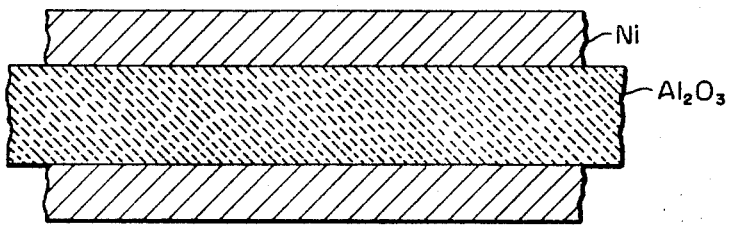

Our invention relates to the fabrication of composite articles and materials. More particularly it relates to the manufacture of articles or materials composed of a first metal oxide and a second metal, the first metal oxide and the second metal being capable of spinel formation at the interface between the first metal oxide and the oxide of the second metal.

There are a number of applications for composite materials made up of metal oxides such as aluminum oxide, ferric oxide and vanadium oxide and metals such as nickel, zinc, iron, magnesium, beryllium, cadmium, cobalt, manganese, titanium, tin, etc. For example, single crystals of the metal oxide, called "whiskers" may be incorporated into a matrix of one of the other metals to form a composite material of high strength at elevated temperatures. It may also be desired to coat a substrate of a refractory material such as alumina with a thin film of a magnetic material for use in computer memories. A further use of composite materials of this general class is in high temperature machinery such as gas turbines where it is desired to protect metal parts from the corrosive effects of high temperature gases. To this end the metal parts may be provided with a protective coating of refractory metal oxide.

These composite materials require that a strong tight bond be formed between the metal oxide material and the metal. In the past such a bond has not been achieved, although there has been substantial effort expended to solve the problem.

We have found that if the interfaces of the layers of material between the metal and the metal oxide are partially or fully coherent, then a much stronger bond than those heretofore achievable will result between the metal and the refractory metal oxide. As the term is used herein, a coherent interface is one in which there is a relationship between the orientations of the crystals on each side of the interface resulting from the "matching" of a particular aspect of one of the crystal structures, such as an interplanar distance, with a geometrically similar but crystallographically different aspect of the structure of the other. In particular we have found that such coherent interfaces, resulting in a tight bond between metals and metal oxides such as those mentioned above are obtained when the progression from the metal to the metal oxide includes two intermediate layers, one being an oxide of the metal (which is coherent with the metal) and the other being a spinel which is coherent both with the oxide of the metal and with the metal oxide. If the metal is designated as M and the metal oxide is designated as $N_2O_3$, then the progression from the metal to the refractory oxide may be expressed as:

$$M-MO-MN_2O_4-N_2O_3$$

The dashes indicate coherent interfaces as above defined and the compound $MN_2O_4$ is a spinel formed by the oxides of the metal and the refractory metal oxide. The intermediate layers MO and $MN_2O_4$ are quite thin, being only a few molecules in thickness. However, their presence insures a tight bond, even at elevated temperatures, between the metal oxide and the metal. We have found that the bond between the metal and the metal oxide is stable and suffers no degradation either at high temperatures or over long periods of time. Finally, since the only additional chemical element introduced into the bond between the metal and the metal oxide is oxygen, bonding of the type described does not introduce unwanted side effects. We have further found that completely coherent interfaces are not necessary; effective bonding can also be achieved if the interfaces are partially coherent.

The term "spinels" as used herein refers to a class of inorganic chemical compounds having the general formula $MN_2O_4$ where M is divalent metal such as nickel, zinc, beryllium, cadmium, iron (ferrous) cobalt, manganese, titanium, tin, etc., and N is a trivalent metal such as aluminum, iron or vanadium. Spinels are of two types, the so-called "normal" type and the "inverse" type. They are distinguished by different arrangements of the divalent and trivalent cations in the crystal of the spinel. Examples of normal spinels are $ZnFe_2O_4$, $CdFe_2O_4$, $MgAl_2O_4$, $FeAl_2O_4$, $CoAl_2O_4$, $NiAl_2O_4$, $MnAl_2O_4$. The second class, the so-called "inverse" spinels, which have a slightly different arangement of cations are also written in slightly different form to distinguish the two types of spinels. Examples of inverse spinels are $FeM_gFeO_4$, $FeTiFeO_4$, $Fe_3O_4$, $ZnSnVnO_4$, $FeNiFeO_4$ and other ferrites.

One application where the bonding concepts of our invention finds particular utility is in the manufacture of whisker strengthened materials and the particular method of our invention will be illustrated by a detailed description of a method of manufacture of such materials hereinafter. However, it is emphasized that this description is illustrative only, and that the specific procedures and steps there described may be readily utilized in the manufacture of other composite articles and materials.

It is accordingly a principal object of our invention to provide a method of producing a physically strong, stable bond between a metal and a metal oxide. A further object of our invention is to provide a multi-layer bond between a metal and a metal-oxide in which all the interfaces between each of the layers are coherent. Another object of our invention is to provide improved whisker-strengthened metal alloys which are particularly suitable for high temperature applications. A further object of our invention is to provide metal articles having bonded thereto a refractory metal coating.

A more specific object of our invention is to provide a nickel or nickel alloy material sterngthened with alumina whiskers for high temperature use. These and other objects of our invention will in part be obvious and will in part appear hereinafter.

Our invention accordingly comprises the several steps and the relation of one or more of such steps with respect to each of the others, and the article possessing the features and properties all of which are exemplified in the following detailed disclosure. The scope of our invention will be indicated in the claims.

For a fuller understanding of the nature and objects of our invention, reference should be had to the following detailed description taken in connection with the accompanying drawing, in which:

FIGURES 1, 2, 3 and 4 are cross-sectional views of an alumina whisker which is to be incorporated into a nickel or nickel alloy matrix after completion of the first, second, third and fourth steps of the process of our invention respectively.

In general, in manufacturing metal oxide composite materials in which the metal is bonded to the metal oxide in accordance with our invention, we first plate a thin coating of the metal on the metal oxide material by any known means. This thin metal coating is then oxidized throughout its volume at a temperature below that at which spinel formation between the two metal oxides can take place. After the metal film has been completely oxidized, the temperature of the atmosphere surrounding the composite article is raised to a value above that at which spinel formation can take place and the interface between the two metal oxides is converted to a spinel. Finally the outer portion of the metal oxide film is reduced to the metal, thus forming the progression of layers described above. Alternatively the metal layer can be formed by deposition of the metal on its oxide rather than by reduction of the oxide to the metal. Additional metal of the same kind as that on the outer surface may then be adhered to the thin metallic film which is now tightly bonded to the refractory material.

When the process as above described is used to produce an article having a protective refractory coating, the interior of the coating will be first plated, and oxidized. Thereafter, the temperature will be raised to cause spinel formation and thereafter the interior metal oxide will be partially reduced to the metal. Thereafter adidtional metal may be added by conventional methods to the metal film formed on the interior of the refractory metal coating.

As mentioned above, our invention is applicable to the formation of whisker-strengthened high temperature materials. More particularly it is applicable to the manufacture of nickel or nickel-alloy materials strengthened with alumina whiskers.

Alumina whiskers are nearly perfect single crystals of $Al_2O_3$ which exhibit great tensile strength at elevated temperatures. They are usually 1 to 30 microns in diameter and their length/diameter ratio lies in the range between 10 and 5000. Nickel and nickel alloys are particularly suitable as a matrix material into which the whiskers may be embedded because of their high melting points, strength and ductility.

Attempts have heretofore been made to incorporate alumina whiskers in a metal matrix and particularly in a nickel or nickel alloy matrix. One method previously tried involved pouring molten nickel into a mat of whiskers. Such attempts failed because the alumina was not "wet" by the nickel. It was also attempted to add alloying elements to the molten nickel but these materials sometime chemically attacked the alumina whiskers.

Another unsuccessful attempt to manufacture alumina whisker-reinforced nickel or nickel alloys involved the coating of the whiskers with a high melting point material which would bond both to the whisker and to the nickel or nickel alloy. This method also has failed; either the coatings would attack the whiskers or they would be badly damaged when molten nickel was poured over the whisker mat.

In manufacturing nickel or nickel alloys reinforced with alumina whiskers according to our invention, a thin film of nickel is first bonded to the alumina whisker by the methods heretofore described and these nickel coated whiskers may then readily be added to a nickel matrix.

We will describe in some detail the process of manufacture of an alumina whisker-reinforced nickel and nickel alloy material as a specific example of the manner of making the physically strong bond between a metal and a metal oxide with which our invention is concerned, it being understood that an exactly similar process might be used to manufacture articles having refractory coatings, or to form other useful articles in which a metal is tightly bonded to a metallic oxide.

Single crystal whiskers of alumina as purchased in the open market are commonly received in matted, tangled form. In this event, it is advisable initially to separate each whisker from the others, for example, by agitation, fanning and throwing, as with a common kitchen food blender.

With a supply of clean alumina whiskers which are neither tangled nor matted, the first step of the process of the invention is to deposit a film of metallic nickel over the entire surface of each one. This deposition can be carried out by evaporating, i.e., "sputtering" or by electroless chemical deposition. Electroless plating is a known process and is described, for example, in an article entitled "Physico-Chemical Principles of Nickel Plating" by K. M. Gorbunova and A. A. Nikeforora, a publication of the Israel Program for Scientific Translation, Silvan Press, Jerusalem, 1963. To ensure that the entire surface of each whisker is properly covered with nickel, the whiskers should be vehemently agitated while the deposition is in process. The product of this step of the process is shown in FIG. 1.

The deposition of the metallic nickel film does not by itself result in a tight bond between the nickel and the alumina. The next step of the process is to expose the nickel-plated whiskers to an atmosphere containing oxygen, and simultaneously to subject the whiskers to temperatures which, while moderately elevated, always lie below a critical temperature T at which spinel formation can first take place. The critical temperature will depend upon the kind of spinel to be formed in each case. For the formation of $NiAl_2O_4$, for example, this critical temperature is of the order of 1000° C. This exposure should continue for a time sufficient to oxidize the nickel film throughout its entire volume to provide nickel oxide over the entire interface between the alumina and the film. Provided the exposure takes place in the upper part of its permitted range, the exposure time may be as short as an hour or two. But, unless exceptional care is exercised to insure that the temperature never exceeds the critical temperature T, the final product may be seriously endangered by employment of too narrow a temperature margin. Hence, it is recommended that the process be carried out more conservatively and that the fabricator keep the temperature during exposure below the critical temperature T by a margin of 100° C. or so. In this way certainty of the result is ensured at the price of speed.

Figure 2:
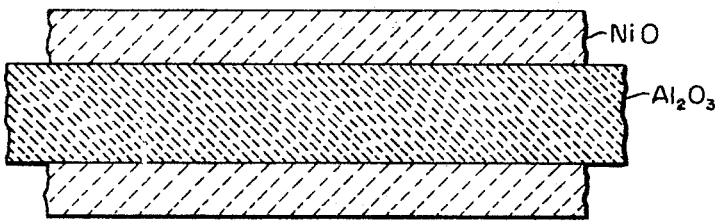
Figure 3:
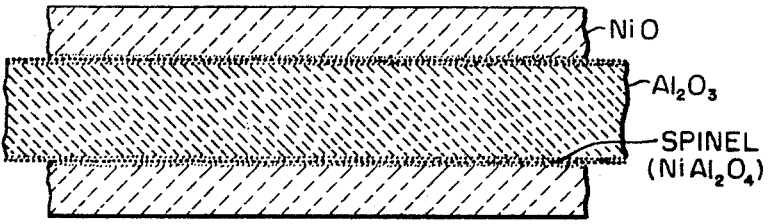

While this oxidation step can be carried out in air it is preferred to employ an atmosphere having a controlled amount of oxygen, the remaining constituents being gases which are inert or at least gases which can form no compounds with any of the elements, nickel, aluminum and oxygen. The product of this step is shown in FIG. 2.

Following the oxidation step, the temperature is raised above the critical temperature T and held at this higher temperature for a period sufficient to generate at the interface between the alumina of the whisker and the nickel oxide of the film a uniformly very thin intermediate layer of spinel having the composition $NiAl_2O_4$. This spinel is itself of crystalline structure so that the oxygen sub-lattice may be continuous from the alumina, through the spinel, to the nickel oxide. In consequence, the nickel atoms are now bonded to the oxygen atoms of the whisker just as are the aluminum atoms of the original alumina; i.e., they are bonded crystallographically in contrast to mechanically. In the same way, the outer surface of this newly formed intermediate layer of crystalline spinel structure is bonded to the nickel atoms of the nickel oxide film i.e. the alumina-spinel interface and the spinel-nickel oxide interface are both coherent. The intermediate spinel layer constitutes a vehicle through which essentially a chemical bond is established on one side to the alumina of the whisker and on the other side to the nickel of the oxide film.

The intermediate spinel layer should be as thin as possible but it should have no gaps. To insure against the presence of gaps, it is advisable to continue the spinel formation until its thickness is a few times the width of a unit cell; i.e., several millimicrons. It is also advisable to proceed with caution, and not to seek for high reaction speeds but rather, in order best to control the thickness of the spinel layer, to keep the temperature margin above the critical temperature T fairly small. We have found the exposure time of from one to twenty-four hours is preferred although shorter or longer times may be used as previously described.

The critical temperature T, below which the oxidation step is to be carried out and which is then to be exceeded by a small though safe margin in carrying out the spinel-forming step, may vary slightly with variation of conditions. Nevertheless, it is, for any particular set of conditions, a well defined critical temperature and can be determined by X-ray diffraction measurements which, when the temperature is above T show the formation of a spinel and, when it is below T, show that no spinel has been formed.

The critical temperature T should not be exceeded until the entire deposited nickel film shall have been oxidized; that is to say, until oxygen atoms, as well as nickel atoms, shall have been made available for later spinel formation throughout the entire area of the interface. In this way a uniform thickness of the spinel layer is ensured. Substantial uniformity of thickness of the spinel layer is important for the reason that the spinel is brittle and is of itself not particularly strong. It is formed for the sake of the bonds which it provides; but if it were of more than minimal thickness, it would weaken the fibre, both by virtue of its own inherent weakness and through reduction of the cross-section of the whisker. Reduction in cross-section of course reduces whisker strength.

The ultimate whisker reinforced material should be ductile and for this reason the matrix material should also be ductile. This means that it should be a metal or an alloy. In the past considerable difficulty has been encountered in establishing a bond between the matrix of nickel or alloy and any other compound, and this difficulty holds even when the aim is to bond nickel or one of its alloys to nickel oxide. This is for the reason that, when establishing a bond to a solid, it is necessary that the entire surface of the solid be wetted.

Figure 4:
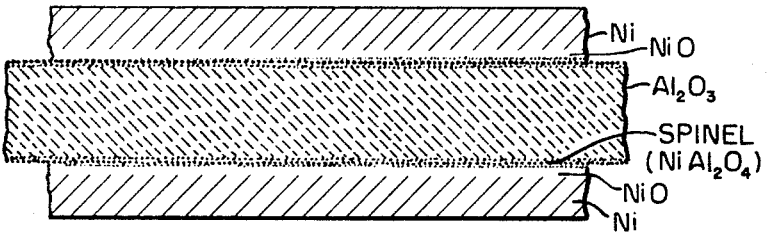

Accordingly, as shown in FIG. 4, the next step of the process of the invention is to remove all of the excess oxygen from what remains of the oxide film, thus leaving the nickel in metallic form over its entire exterior surface and throughout the major part of its volume; i.e., throughout its entire volume except for an inner layer of minute thickness bordering on, and bonded to, the spinel layer. This oxygen removal is to be carried out by reducing the nickel oxide film to metallic nickel. To this end the fibres, processed as described above and thus plated with tightly bonded nickel oxide, are exposed to an atmosphere containing hydrogen, preferably at a moderately elevated temperature which may lie in the range 400° C. to T. Provided the temperature T is not exceeded, there is no danger of destroying the spinel layer by reduction because its critical reduction temperature is considerably higher than the formation temperature T. Nor is there danger of removing the oxygen from the inner surface of the oxide film, because it is so tightly bonded to the spinel layer.

This reduction can be continued for a period in the range 1 to 12 hours. As with the other steps, the higher the temperature employed, the greater the speed of the reaction, while the lower the temperature employed the longer the time required and the greater the certainty of avoiding damage to the produce.

The fibres, now bearing films which, at least on their outer surfaces, are of pure metallic nickel and which are bonded to the alumina cores through the agency of the intermediate nickel oxide and spinel layers, are now mixed with powdered metal, illustratively a nickel-chromium alloy, of which the chromium constituent acts to protect the nickel from oxidation. Advantageously, the diameters of the powder grains are of the same order of magnitude as the diameters of the whiskers or somewhat greater. This mixture of coated whiskers and metal powder grains is now formed into a solid mass by the exercise of conventional powdered metallurgy techniques; for example, it is heated to a temperature which is below the melting point of any constituent but is otherwise unrestricted and, at the same time, the mixture is subjected to pressures of the order of several tons per square inch. After the mass has been thus compacted it can be rolled, forged, or otherwise worked to a desired shape.

The resulting material has substantially greater strength than nickel or nickel-alloy materials not reinforced with the alumina whiskers, and further will maintain this strength at very high temperatures.

It will thus be seen that we have provided a novel method of bonding a first metal to a metal-oxide when the oxide of the first metal and the original metal oxide are capable of spinel formation in a temperature region above that at which the first metal will oxidize. By the method of our invention we can provide a tight strong bond between the metal and the metal-oxide through a series of layers, each of the interfaces between the layers being coherent. We have illustrated the method of our invention by describing the manner in which it may be used to produce an alumina whisker-reinforced nickel or nickel alloy material.

It will thus be seen that the objects set forth above, among those made apparent from the preceding decription, are efficiently attained and, since certain changes may be made in carrying out the above method and in the article set forth without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. A method of making an article of a metal oxide said metal oxide being selected from the group consisting essentially of aluminum oxide, ferric oxide and vanadium oxide with a tightly bonded coating of a second metal M, the metal M being selected from the group consisting essentially of nickel, zinc, magnesium, iron, beryllium, cadmium, cobalt, manganese, titanium and tin, the oxide of the second metal M and the metal oxide of the article being capable of spinel-formation at an elevated temperature comprising, in combination, the steps of:

(1) plating the article with a film of the metal M,
(2) exposing said plated article to an oxygen containing atmosphere at a temperature below the spinel-forming temperature for a period sufficient to oxidize the film of metal M throughout its volume,
(3) raising the temperature to which said oxide-coated article is subjected above the spinel-formation temperature to thereby generate a spinel layer at the interface between the article and the M-oxide coating, the interfaces between said spinel layer and other metal oxide of said article and between said spinel layer and the oxide of metal M both being coherent; and (4) coating the surface layer of the oxide of the metal M with a layer of the metal M.

2. The method defined in claim 1 in which the metal oxide of said article is aluminum oxide and the metal M is nickel and in which the spinel forming temperature is about 1000° C.

3. The method defined in claim 1 in which the article of metal oxide material is a monocrystalline fiber.

4. The method defined in claim 3 in which said metal oxide is aluminum oxide and said metal M is nickel.

5. An article of manufacture made of a metal oxide having a tightly bonded coating of a second metal M, said article having two intermediate layers between said metal oxide and the coating of metal M, said layers being in order of progression from said metal oxide to said coating, a spinel layer formed by the metal oxide of said article and the oxide of said metal M and a layer of the oxide of said metal M, said metal oxide being selected from the group consisting essentially of aluminum oxide, ferric oxide and vanadium oxide and the metal M being selected from the group consisting essentially of nickel, zinc, magnesium, iron, beryllium, cadmium, cobalt, manganese, titanium and tin.

6. The article defined in claim 5 in which said metal oxide is aluminum oxide and said metal M is nickel.

References Cited

UNITED STATES PATENTS 2,776,472   1/1957   Mesick _____ 117—71
3,038,817   6/1962   Day et al. _____ 117—69

FOREIGN PATENTS 1,095,732   12/1960   Germany.

ALFRED L. LEAVITT, Primary Examiner

C. K. WEIFFENBACH, Assistant Examiner

U.S. Cl. X.R.

29—195, 196, 197, 198